(No Model.)
C. POPE.
APPARATUS FOR MANUFACTURING GLUCOSE OR SUGAR FROM STARCH.
No. 570,183. Patented Oct. 27, 1896.
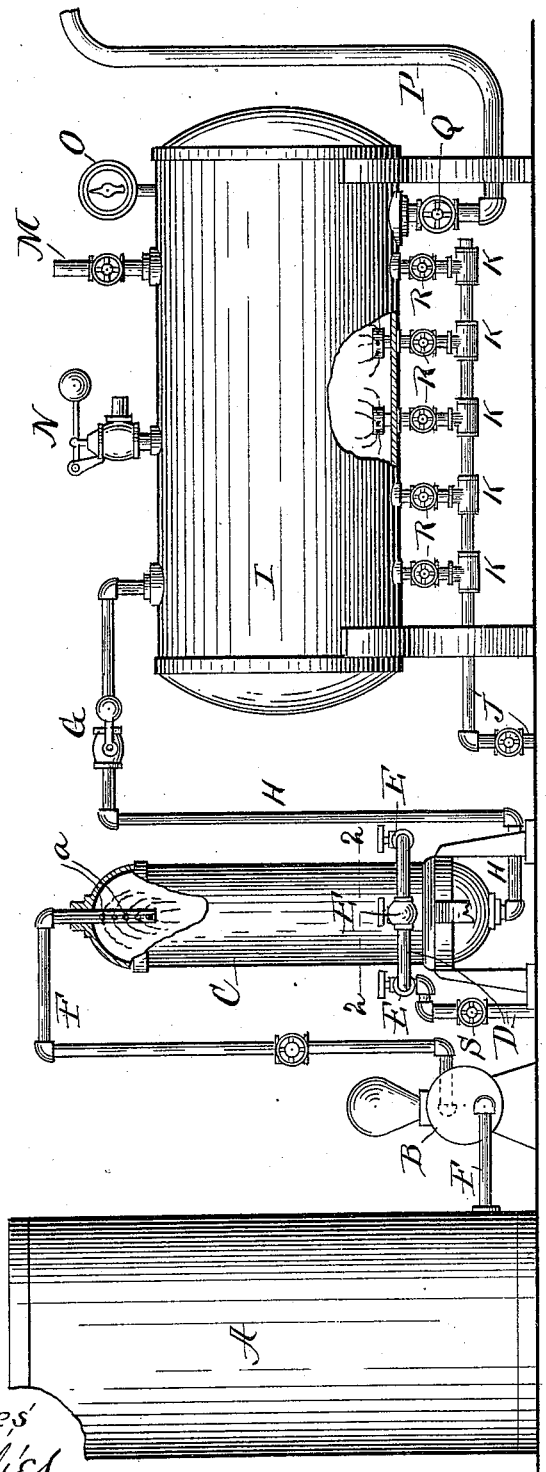

UNITED STATES PATENT OFFICE.

CHARLES POPE, OF CHICAGO, ILLINOIS.

APPARATUS FOR MANUFACTURING GLUCOSE OR SUGAR FROM STARCH.

SPECIFICATION forming part of Letters Patent No. 570,183, dated October 27, 1896.

Application filed September 19, 1895. Serial No. 562,976. (No model.)

*To all whom it may concern:*

Be it known that I, CHARLES POPE, a citizen of the United States, residing at Chicago, in the county of Cook and State of Illinois, have invented a certain new and useful Improvement in Apparatus for the Manufacture of Glucose or Sugar from Starch, which is fully set forth in the following specification, reference being had to the accompanying drawings, in which—

Figure 1 represents a side elevation of my apparatus; and Fig. 2, a sectional view taken at the line 2 2, Fig. 1, looking down.

My invention relates to that class of apparatus in which starch that has first been extracted from grain and reduced to the form of what is termed "starch-milk" is treated chemically to be converted into glucose or sugar.

My invention consists more particularly in that part of the apparatus which I term the "liquefier."

It also consists in the combination, with the liquefier, of the other parts of the apparatus, all of which is hereinafter fully described, and made the subject-matter of the claims hereof.

In the accompanying drawings, A represents a tank or vessel in which I mix the starch-milk and the chemicals to be used, preferably sulfurous acid, in a liquid form.

B is a pump adapted to be used in pumping the mixture from the tank A into the liquefier C.

F is a pipe connecting the tank A to the pump. The pump B may be of any of the well-known kinds of pumps. The pipe F passes into the top of the liquefier and has perforations $a$ in it, through which the fluid is discharged into the liquefier C.

D is a steam-pipe with several discharge-nozzles E for discharging steam into the lower portion of the liquefier C to heat up the mixture under pressure in the liquefier.

H is a pipe connecting the bottom of the liquefier C with a converter tank or vessel I.

G is a check-valve in the pipe H, so constructed as to regulate the pressure in the liquefier C and at the same time admit of the passage of the contents of the liquefier C into the converter I.

J is also a steam-pipe having nozzles K, through which steam is admitted into the bottom of the converter I.

M is an escape-pipe, through which air can escape from the converter I.

N is a safety-valve on the top of the converter.

O is a gage.

P is a blow-off pipe from the converter, leading to any ordinary tank or receptacle for receiving the glucose or sugar after the conversion is completed in the converter I.

Q is a cock in the blow-off pipe P. The nozzles K are also provided with cocks R. The steam-pipe D is provided with a cock S.

The operation of my apparatus is as follows: I mix the starch-milk and sulfurous acid in the tank A, using sufficient acid to convert the starch, mixing them cold, so that the sulfurous acid remains in a liquid condition. Before starting the pump I fill the liquefier C with water and heat it by admitting the steam, or it may be filled with hot water from the tank. I also open the air-pipe M and admit steam through the pipe J and nozzles K, blowing the air out of the converter I, filling it with steam. I then start the pump B and pump the liquid mixture in the tank A into the liquefier C, admitting steam into the lower portion of the liquefier, heating the liquefier to a temperature of from 250° to 300° Fahrenheit, which heat, together with the pressure, causes the sulfurous acid to immediately mingle with the starch-milk, when liquefaction of the starch immediately commences. The liquefier is kept full, the liquid pumped in replacing that which passes into the converter, since, as the liquefaction is going on by the complete commingling of the acid with the starch, the mixture is forced from the liquefier through the pipe H into the converter I until the converter is filled with the liquefied starch. The conversion of the starch is continued in the converter until the desired conversion takes place to convert it either to glucose or sugar. When the conversion is completed, the cock in the blow-off pipe P is opened and the contents removed into any suitable receptacle.

I am aware that it has frequently been attempted to use sulfurous acid in the making of glucose or sugar from starch; but by the processes hitherto employed the acid has been injected into the starch-milk in the liquefier and when the mixture of starch and acid has been heated the acid vaporizes—that is, forms sulfurous-acid gas in the top of the receptacle. The starch collects below and forms a paste. In practice, therefore, these processes have not been successful in producing complete liquefaction of the starch, since they have not provided for maintaining a complete mingling of the starch and acid during the process of liquefaction. Therefore the use of sulfurous acid in the making of sugar from starch has not hitherto been successful.
It will be understood that the steam-pipes can be arranged for admitting steam to the various tanks or vessels in any of the well-known ways and that any kind of pump may be used, or the form of the tanks or vessels may be varied.

Although I describe herein the process in connection with which my apparatus is used, I do not claim such process herein, but make the said process the subject of claims in a second application for patent, Serial No. 562,977, filed simultaneously herewith.

What I claim, and desire to secure by Letters Patent, is—

1. In an apparatus for making glucose, &c., from starch, a tank adapted to hold starch-milk and acid, a liquefier adapted to receive the said starch-milk and acid, a pump adapted to pump the starch-milk and acid from the tank into the liquefier, suitable means for heating the liquefier and a converting tank or receptacle I connected with the discharge-pipe from the liquefier, with means for supplying heat to the converting-tank I.

2. In an apparatus for making glucose, &c., from starch, a mixing-tank for mixing the starch-milk and acid, a pump for pumping the mixture into a liquefier, a liquefier connected with said pump, means for heating the liquefier, a converting tank or receptacle I connected with the liquefier by pipe H provided with a pressure-regulating check-valve G, and means for heating the said converting-tank.

CHARLES POPE.

Witnesses:
ALOYSIA HELMICH,
A. A. MURRAY.